United States Patent
Natesh et al.

(10) Patent No.: US 10,635,280 B2
(45) Date of Patent: *Apr. 28, 2020

(54) INTERACTIVE INTERFACES FOR GENERATING ANNOTATION INFORMATION

(71) Applicant: A9.com, Inc., Palo Alto, CA (US)

(72) Inventors: Aishwarya Natesh, Mountain View, CA (US); Daniya Zamalieva, Mountain View, CA (US)

(73) Assignee: A9.COM, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/536,910

(22) Filed: Aug. 9, 2019

(65) Prior Publication Data

US 2019/0361595 A1 Nov. 28, 2019

Related U.S. Application Data

(63) Continuation of application No. 15/362,600, filed on Nov. 28, 2016, now Pat. No. 10,379,721.

(51) Int. Cl.
| | | |
|---|---|---|
| *G06T 7/00* | (2017.01) | |
| *G06F 3/0484* | (2013.01) | |
| *G06F 3/0482* | (2013.01) | |
| *G06Q 30/06* | (2012.01) | |

(52) U.S. Cl.
CPC ........ *G06F 3/04845* (2013.01); *G06F 3/0482* (2013.01); *G06Q 30/0641* (2013.01); *G06T 7/0081* (2013.01); *G06T 2200/24* (2013.01)

(58) Field of Classification Search
CPC ..... G06F 3/048–04897; G06F 3/04845; G06F 3/0482; G06Q 30/0641; G06T 7/00–97; G06T 2200/24
See application file for complete search history.

(56) References Cited

U.S. PATENT DOCUMENTS

| | | | |
|---|---|---|---|
| 6,975,755 B1* | 12/2005 | Baumberg | G06K 9/4642 345/419 |
| 8,532,372 B2* | 9/2013 | Youngman | G06Q 30/0601 382/162 |
| 9,177,225 B1* | 11/2015 | Cordova-Diba | G06T 5/00 |
| 9,436,704 B2* | 9/2016 | Gershon | G06T 7/11 |

(Continued)

OTHER PUBLICATIONS

Notice of Allowance issued in allowed U.S. Appl. No. 15/362,600 dated Apr. 5, 2019.

*Primary Examiner* — Sean T Motsinger
(74) *Attorney, Agent, or Firm* — Hogan Lovells US LLP

(57) ABSTRACT

Approaches provide for an interactive interface for determining annotation information that can be used to recommend content, improve user interaction and satisfaction, as well as improve various image recognition approaches. For example, a user can be presented an interactive interface, such as a game. The interactive interface can include colored graphical elements, where each graphical element can be associated with and display a visual feature of an item. A user can be provided a task or goal, such as to select, move, or otherwise arrange graphical elements based on a visual feature of the elements. The user interaction can generate annotation information that can be utilized to determine related content as well as improve various image recognition approaches.

20 Claims, 8 Drawing Sheets

(56) References Cited

U.S. PATENT DOCUMENTS

| | | | |
|---|---|---|---|
| 10,043,109 B1* | 8/2018 | Du | G06N 3/0454 |
| 10,062,173 B1* | 8/2018 | Padfield | G06K 9/6255 |
| 10,083,521 B1* | 9/2018 | Dhua | G06K 9/4652 |
| 10,109,051 B1* | 10/2018 | Natesh | G06K 9/4652 |
| 10,387,938 B2* | 8/2019 | Miller | G06Q 30/0627 |
| 2002/0138481 A1* | 9/2002 | Aggarwal | G06Q 30/02 |
| 2003/0231185 A1* | 12/2003 | Kupersmit | G06T 11/001 |
| | | | 345/589 |
| 2009/0281925 A1* | 11/2009 | Winter | G06Q 30/0601 |
| | | | 705/26.1 |
| 2011/0320400 A1* | 12/2011 | Namini | G06F 16/21 |
| | | | 707/610 |
| 2012/0099784 A1* | 4/2012 | Marchesotti | G06F 16/5838 |
| | | | 382/162 |
| 2013/0204743 A1* | 8/2013 | Gershon | G09G 5/022 |
| | | | 705/26.9 |
| 2013/0249934 A1* | 9/2013 | Gershon | G09G 5/022 |
| | | | 345/594 |
| 2014/0310304 A1* | 10/2014 | Bhardwaj | G06F 16/583 |
| | | | 707/769 |
| 2015/0106235 A1* | 4/2015 | Gershon | G06F 16/5838 |
| | | | 705/26.63 |
| 2015/0178786 A1* | 6/2015 | Claessens | G06F 16/901 |
| | | | 705/14.66 |
| 2015/0228086 A1* | 8/2015 | Maurer | G06K 9/6202 |
| | | | 382/100 |
| 2015/0235389 A1* | 8/2015 | Miller | G06Q 30/0643 |
| | | | 345/594 |
| 2015/0332479 A1* | 11/2015 | Gershon | G06F 16/5838 |
| | | | 382/164 |
| 2016/0371854 A1* | 12/2016 | Gershon | G06K 9/6202 |
| 2017/0169585 A1* | 6/2017 | Chen | G06F 3/04817 |
| 2017/0200289 A1* | 7/2017 | Gershon | G06K 9/6202 |
| 2019/0205962 A1* | 7/2019 | Piramuthu | G06F 16/583 |

* cited by examiner

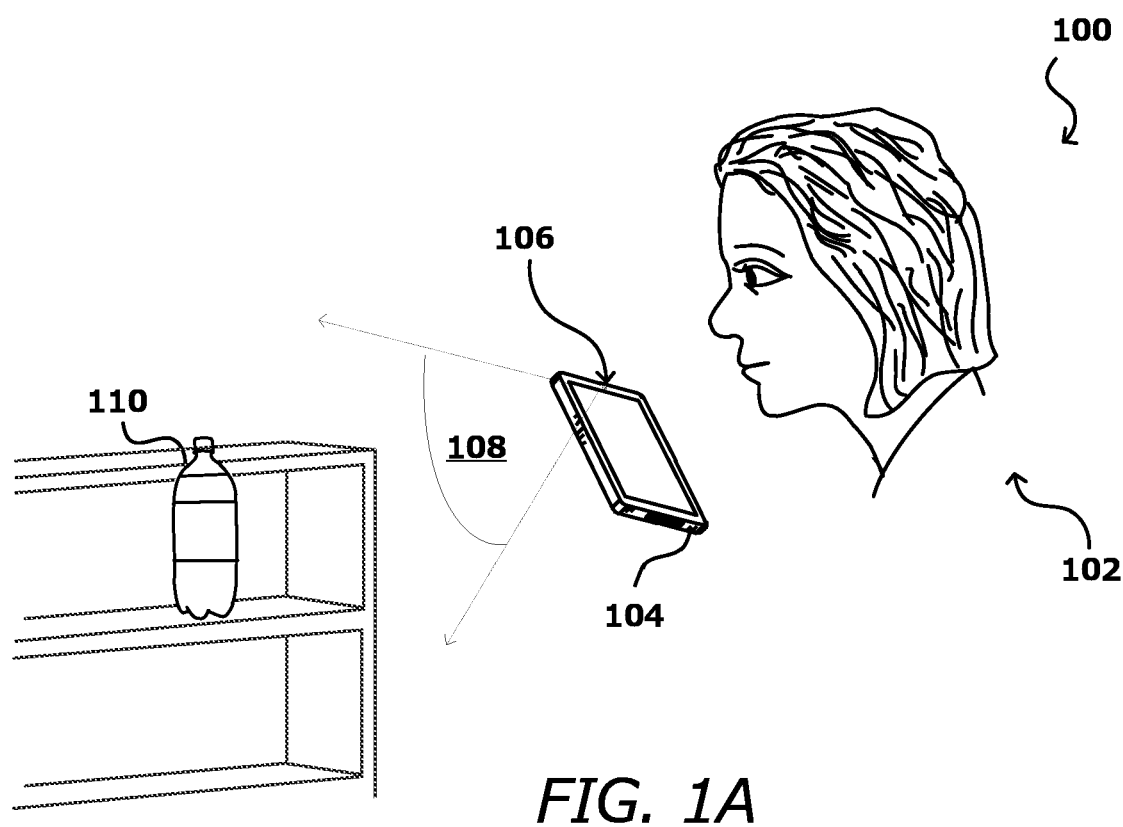
FIG. 1A
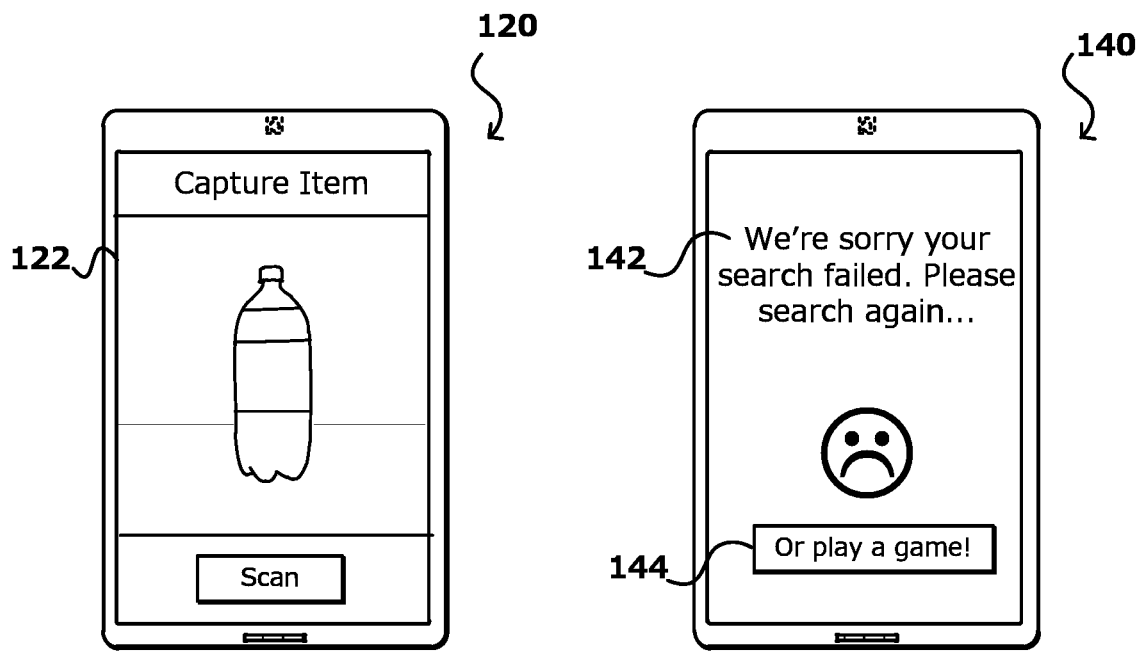
FIG. 1B
FIG. 1C

INTERACTIVE INTERFACES FOR GENERATING ANNOTATION INFORMATION

CROSS-REFERENCE TO RELATED APPLICATION

This application claims priority to allowed Non-Provisional patent application Ser. No. 15/362,600 filed Nov. 28, 2016, titled "INTERACTIVE INTERFACES FOR GENERATING ANNOTATION INFORMATION", which is hereby incorporated by reference herein in its entirety.

BACKGROUND

Users are increasingly using electronic devices to obtain various types of information. For example, a user wanting to purchase a product can interact with their electronic device to browse an electronic catalogue of products, and to search for different types of products that are being offered in the electronic catalogue through an electronic marketplace. Unless the user knows an exact brand or style of the product that the user wants, however, the user might have to search through hundreds or thousands of different products using various options to locate the product in which the user is interested. In some situations, a user may capture an image of a product and utilize image recognition software to recognize the product represented in the captured image. In this example, however, the item may not be recognized due to, for example, lighting conditions that exist at the time the image is captured, movement of a camera used to capture the image, unique characteristics of the item that make it difficult to recognize, among other such factors. Typically, in response to failing to recognize an item, the user can be provided a message alerting the user to attempt an additional search, such as by capturing a new image of the item, or inputting a text or voice search query. However, this can be time consuming and potentially frustrating for a user, which can result in the user not locating the item and the electronic marketplace not completing a transaction.

BRIEF DESCRIPTION OF THE DRAWINGS

Various embodiments in accordance with the present disclosure will be described with reference to the drawings, in which:

FIGS. 1A, 1B, and 1C illustrates an example situation in which a user is attempting to recognize an item of interest in accordance with various embodiments;

DETAILED DESCRIPTION

Figure 2:
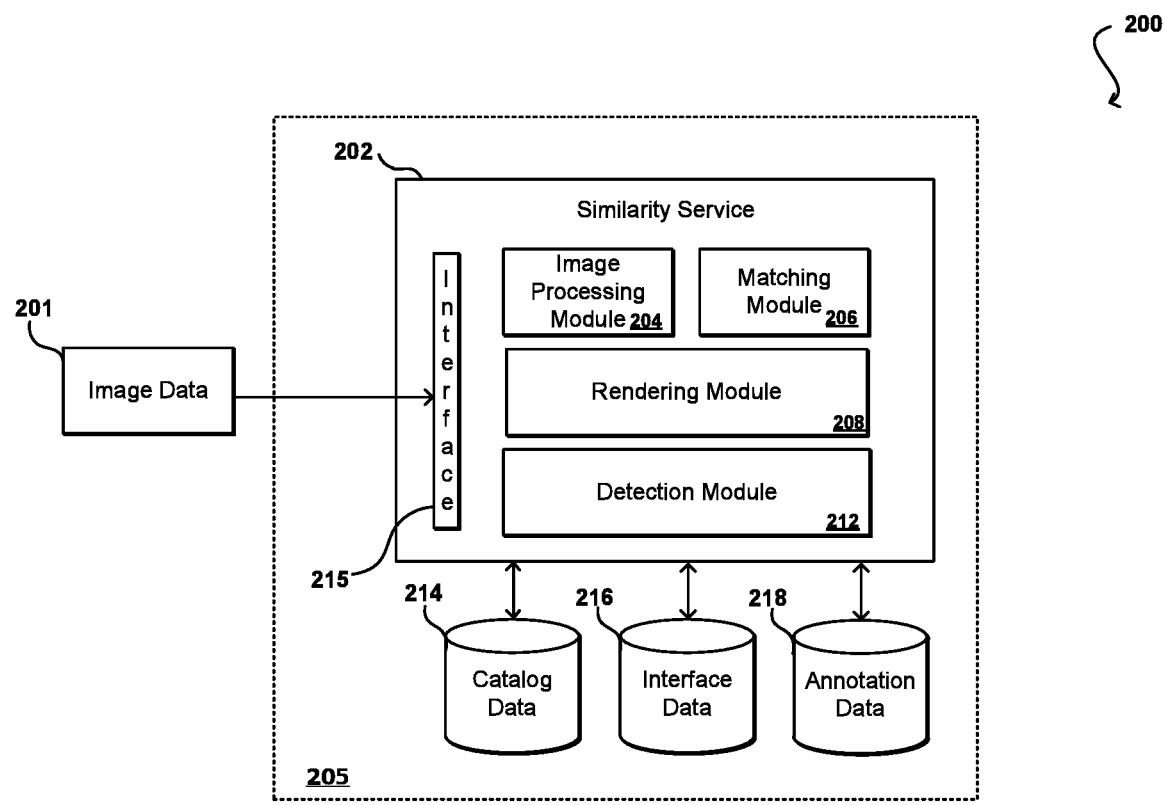
FIG. 2 illustrates an example system for determining annotation information in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure overcome one or more of the above-described deficiencies and other deficiencies in conventional approaches to determining information about items using a computing device. In particular, various embodiments of the present disclosure can provide an interactive interface for determining annotation information that can be used to recommend content, improve user interaction and satisfaction, as well as improve various image processing techniques. For example, a camera of a computing device can be used to capture image data that includes a representation of an item. An application executing on the computing device (or at least in communication with the computing device) can analyze the image data to attempt to recognize the item and retrieve information associated with the item. In some situations; however, the item may not be recognized. In such a situation, the user can be presented an interactive interface, such as a game, that can be used to entertain the user as well as provide a means to generate annotation information that can be used to determine a visual similarity between items. An example game is a "dots game."

In various embodiments, the image data is segmented into a plurality of regions (e.g. image segments, image patches, etc.) Each image region can be analyzed to determine, for example, a descriptor that describes a visual attribute (e.g., color, pattern, texture, etc.) of a respective image region. In various embodiments, the descriptor can also describe visual features based on other visual arrangements represented in the image data. The descriptor for a particular image region can be compared against a stored set of color descriptors. A color descriptor of the stored set of color descriptors can be an area or patch of a product. For example, a stored color descriptor can be associated with an area of a dress or some other product. The color descriptor associated with that area describes a color of the area of the product. Based on the comparisons, visual similarity scores can be determined. The visual similarity scores measure a similarity between a color in an image region and a color in a patch. A patch associated a score that satisfies a selection criterion can be included in an interactive interface. This can include patches associated with a highest similarity score or patches associated with a similarity score that satisfies a threshold value, for example.

For example, the interactive interface can include colored graphical elements that are visually similar to the colors and location of colors in the image data. The interactive interface can further display a particular arrangement of graphical elements, where each graphical element can be associated with one of the patches, and thus, may display a color of its associated patch. Once the interactive interface is displayed, a user can be provided a task or goal, such as to select adjacent graphical elements that are the same color. Selecting adjacent graphical elements of the same color can generate annotation information that can be utilized to determine recommended content, such as products of a same and/or complementary color. For example, as described, a graphical element is associated with a patch, and thus, is associated with color information for an area of a product, such as a dress. An adjacent graphical element can be associated with a different area of the product, an area of some other product (e.g., a different dress or a shirt), etc. The annotation information indicates that these products or at least the areas of these products are the same color. Accordingly, annotation information determined from a plurality of users can be used to associate products, such as clothing that may be worn together, items that may be arranged together as part of a display, or other such relations. Thus, a person desiring to purchase a particular outfit might wear other goods that are determined to match the particular outfit, such as an accessory in a complimentary color. As such, in response to a query or other search and/or browsing approach for an item, the color annotation information can be used to recommend items that match or otherwise compliment the item.

Embodiments provide a variety of advantages. For example, in accordance with various embodiments, interactive interfaces, games, or other such interfaces, can be provided in various situations and at appropriate times to engage users as well as obtain useful information. Such information can include annotation information, e.g., color annotation information, and can be used to improve various image processing algorithms as well as provide users with recommended content. As such, in accordance with various embodiments, by providing a system that generates data to effectively recommend content, generates data useful as a ground truth for various image processing algorithms, and increases user interaction, services utilizing such improvements can optimize resources to allow for more efficiently and quickly providing useful information to a user. This can provide for efficient and cost effective interactions, as the additional information can result in a purchase, further use of a service, etc. Various other such optimizations can be utilized as well within the scope of the various embodiments as would be apparent to one of ordinary skill in the art in light of the teachings and suggestions contained herein.

FIG. 1A illustrates an example situation 100 in which a user 102 is attempting to recognize an item of interest 110, e.g., a type of soft drink using a software application executing on the computing device 104. Although a portable computing device (e.g., a smart phone or tablet computer) is shown, it should be understood that various other types of electronic devices that are capable of determining and processing input can be used as well in accordance with various embodiments. These devices can include, for example, notebook computers, personal data assistants, e-book readers, cellular phones, video gaming consoles or controllers, smart televisions, set top boxes, a wearable computer (e.g., a smart watch or glasses), and portable media players, among others. In this example, the computing device 104 has at least one camera 106 (or other image capture sensor or element) operable to perform functions such as image and/or video capture. Each camera may be, for example, a charge-coupled device (CCD), a motion detection sensor, or an infrared sensor, or can utilize another appropriate image capturing technology. In this example, the user can position the device such that one or more items of interest 110 are within a field of view 108 of at least one camera 106 on the computing device. The camera might capture video, such that a "live" view of the captured video information can be displayed on a display screen 122 of the computing device 104, as illustrated in example 120 of FIG. 1B. In other embodiments, the camera might capture a still image showing a representation of the item(s) of interest. In at least some embodiments, the image and/or a frame of the video can be analyzed, such as by analyzing on the device or uploading across a network to a service for analyzing image content. It should be noted that in various embodiments the image data can be downloaded or otherwise obtained to the computing device.

In this example, the item of interest may not be recognized due to, for example, lighting conditions that exist at the time the image is captured, movement of the computing device at the time the image is captured, unique characteristics of the item of interest that make it difficult to recognize, among such factors. For example, it may be determined that an image recognition confidence score is below a threshold confidence score, where the image recognition confidence score indicates a likelihood of correctly recognizing the object. In accordance with various embodiments, the image recognition confidence score can be determined by the image processing algorithm(s) utilized to recognize the object. In conventional approaches, in response to failing to recognize the item of interest, the user can be provided a message 142 to attempt an additional search, such as by capturing additional image data of the item of interest, or inputting a text or voice search query, as illustrated in example 140 of FIG. 1C. However, the process can be time consuming and potentially frustrating for a user, which can result in the user not locating an item of interest and the marketplace not completing a transaction. Accordingly, in accordance with various embodiments, in response to a failed attempt to recognize the item of interest, or for any one of a number of reasons, the user can be presented an opportunity to play a game. For example, a graphical button 144 can be displayed in additional to, or instead of prompting the user to search again. The button 144 can invite the user to play the game, wherein selecting the graphical button 144 can cause the game to launch. In various embodiments, the game can automatically be displayed in response to a failed recognition attempt, or accessed at a time of the user's choosing. The game can take any one of a number of forms. For example, the game can be a memory game. In the memory game, a user can be presented a series of flash cards or other graphical elements. On one side of the flash cards can be a color, the other side can be blank. The cards can be flipped to display the colors on the colored side of the cards, and then flipped to hide the colors. The goal can be to select the cards having the same colors. In another example, the game's interface can include an arrangement of a plurality of graphical elements, each graphical element associated with a color. The user can be provided a task or goal, such as to arrange, select, or otherwise manipulate the graphical elements according to an attribute of the graphical elements. The attributes can include colors, patterns, texture, etc. An example goal of the game can be to select adjacent graphical elements of the same color. Another example goal might include moving graphical elements around the interface such that graphical elements of the same color are adjacent. In response to accomplishing the goal, e.g., receiving a selection of adjacent graphical elements of the same color, annotation information can be generated and utilized to recommend content, improve user interaction and satisfaction, and improve various image recognition approaches, among other such advantages.

FIG. 2 illustrates an example system 200 for determining annotation information in accordance with an embodiment.

As shown in FIG. 2, a similarity service 202 associated with an entity 205 such a service provider can include an image processing module 204, a matching module 206, a rendering module 208, and a detection module 212, although additional or alternative components and elements can be used in such a system in accordance with the various embodiments. Accordingly, it should be noted that additional services, providers, and/or components can be included in such a system, and although some of the services, providers, components, etc. are illustrated as being separate entities and/or components, the illustrated arrangement is provided as an example arrangement and other arrangements as known to one skilled in the art are contemplated by the embodiments described herein.

In this example, image data 201 and other such data can be received at similarity service 202. The image data 201 can be received at, for example, a network interface layer 215 of the similarity service 202. The network interface layer can include any appropriate components known or used to receive requests from across a network, such as may include one or more application programming interfaces (APIs) or other such interfaces for receiving such requests. The network interface layer 215 might be owned and operated by the service provider, or leveraged by the service provider as part of a shared resource or "cloud" offering. The network interface layer can receive and analyze the image data, and cause at least a portion of the information in the requests to be directed to an appropriate system or service of the recommendation system. For example, the image data can be received from a user's computing device to image processing module 204.

The image processing module 204 is operable to analyze the image data to determine a plurality of image regions, segments, or patches. For example, the image processing module can analyze the image to extract a plurality of regions, e.g., an area of pixels, from the image data, from which one or more colors in the image can be identified. The region can be a fixed width and height, e.g., 10 pixels by 10 pixels while in various embodiments the region can be a variable width and height. A variable width and height can be useful in situations where the image includes a number of colors (e.g., more colors than a threshold number of colors) and it is desired that the region include substantially one color. Extracting regions from the image data can allow for identification of a spectrum of colors and other visual information that is present in the image data. In the situation where a region includes multiple colors, the region can be associated with the most dominate color, e.g., the color that most occupies the region.

The image processing module 204 can generate a visual descriptor for each extracted region, such as a color descriptor. A color descriptor describes the spatial distribution of color in an extracted region. There are a number of ways to determine a color descriptor. In one such approach, classifiers can be trained to recognize a color in a region of pixels. A classifier can be trained using a convolution neural network (CNN), for example, and can be used to determine the color descriptor for each extracted region. In accordance with various embodiments, CNNs are a family of statistical learning models used in machine learning applications to estimate or approximate functions that depend on a large number of inputs. The various inputs are interconnected with the connections having numeric weights that can be tuned over time, enabling the networks to be capable of "learning" based on additional information. The adaptive numeric weights can be thought of as connection strengths between various inputs of the network, although the networks can include both adaptive and non-adaptive components. CNNs exploit spatially-local correlation by enforcing a local connectivity pattern between nodes of adjacent layers of the network. Different layers of the network can be composed for different purposes, such as convolution and sub-sampling. CNNs are trained on a similar data set (e.g., a color data set), so it learns the best feature representation for a particular color. It should be noted that any method suitable for generating visual information may be implemented.

The matching module 204 is operable to use the color descriptors determined from the image data to determine a set of patches that are visually similar to colors that are described by the color descriptors. The set of patches can be stored in catalog data store 214. One or more patches of the set of patches can be associated with an item of a catalog of items provided by the service provider. Example items include apparel, shoes, jewelry, etc. The patches associated with each item can be associated with a color descriptor. To determine the set of patches that are visually similar to colors that are described by the color descriptors determined from the image data, the matching module 206 can, for example, compare the color descriptors that were determined from the image data 201 with color descriptors of the patches stored in catalog data store 214. For example, the color descriptors determined from the image data can be compared with a color descriptor of a patch stored in catalog data store 214 using a distance measurement, e.g., dot product, to generate a visual similarity score. A patch stored in catalog data store 214 that is associated a visual similarity score that satisfies a selection criterion can be included in an interactive interface. This can include patches associated with a highest similarity score or patches associated with a similarity score that satisfies a threshold value, for example. As a result, a plurality of patches that are visually similar to a color in the regions determined from the image data 201 can be determined. Data indicating the plurality of patches and their respective image position with respect to its region in the image data can be stored in interface data store 216.

The rendering module 208 can utilize interface data stored in interface data store 216 to generate an interactive interface. An example interactive interface includes a plurality of graphical elements arranged according to a set of rules. In accordance with various embodiments, the rules can be used to control the look and feel of the interface and can be based on a type of interactive interface to display. For example, the look and feel can include a size of the graphical elements, a shape of the graphical elements, animation of the graphical elements, etc. As such, the graphical elements can be associated with one or more of a color attribute that specifies a color of the graphical element, a size attribute that specifies a size of the graphical element, and an animation element that specifies animation characteristics of the graphical element. The order or placement of the graphical elements can substantially match the location of corresponding regions determined from the image data. For example, the interface can display graphical elements associated with colors that map to matching colors of regions determined from the image data. An example type of interactive interface includes a dots game. In the dots game, colored dots can be arranged in columns and rows. The number of columns and rows can be fixed. Alternatively, the number of columns and rows can dynamically adjust based on a size of the interactive interface, which can depend on, for example, a size of a display screen, a resolution of a display screen, among other such factors.

As described, the interactive interface can be part of a game, where the user is provided a task or goal, such as to select adjacent graphical elements of the same color. Accordingly, a user operating the computing device can select adjacent graphical elements of the same color, where selecting adjacent graphical elements of the same color can generate annotation information that can be utilized to determine related content, e.g., products of a same and/or complementary color. For example, a graphical element can be associated with a patch (e.g., area of a product associated with a color) of a product, such as a dress. An adjacent graphical element can be associated with a patch of a different product, such as a different dress or a shirt, and/or a patch of the same product. The annotation information indicates that these products or at least the patches of these products are the same color. The annotation information can be obtained from a plurality of users via a plurality of different computing devices. The annotation information can be stored, for example in data store 218, as well as further processed. This can include, for example, performing various statistical processes on the annotation information. The processed annotation information can be used to associate products, such as clothing that may be worn together, items that may be arranged together as part of a display, or other such relations that may not otherwise be discernible from descriptive information available in an electronic catalog.

For example, in various embodiments, in the situation where a user is viewing a particular product, recommended content can be displayed to the user based on at least the type of product the user is viewing, the color of the product, and annotation information associated with the product. A product search system or other such system can evaluate the annotation information associated with the product, as well as products preferred by a user (e.g., products previously purchased by the user, products placed in the user's shopping cart, and products flagged by the user as being of interest to identify colors that are preferred by the user) or complimentary to the product currently being viewed to identify recommended content to display to the user.

In accordance with various embodiments, similarity service 202 may be performed by any number of server computing devices, desktop computing devices, mainframe computers, and the like. Each individual device may implement one of the modules of the similarity service. In some embodiments, the similarity service can include several devices physically or logically grouped together to implement one of the modules or components of the message service. For example, similarity service can include various modules and components combined on a single device, multiple instances of a single module or component, etc. In one specific, non-limiting embodiment, matching module 206, rendering module 208 and detection module 212 can execute on one device and image processing module 204 can execute on another device. In another embodiment, the modules can execute on the same device.

In some embodiments, the features and services provided by the similarity service may be implemented as web services consumable via a communication network. In further embodiments, the similarity service is provided by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

Figure 3:
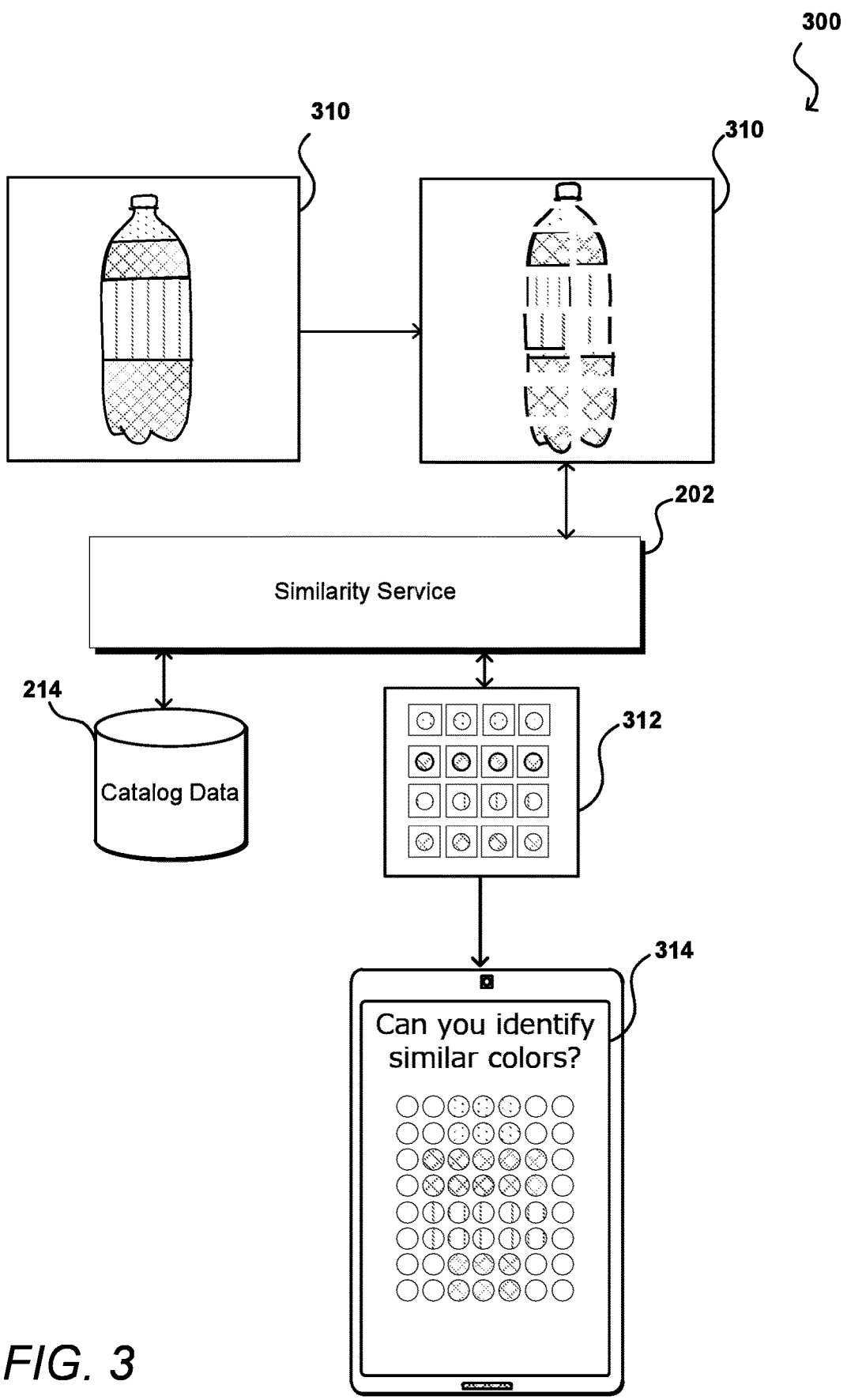
FIG. 3 illustrates an example for determining annotation information in accordance with various embodiments.

FIG. 3 illustrates an example 300 for determining annotation information in accordance with an embodiment. In this example, a visual search query 310 is received from a computing device, e.g., computing device 104 described in reference to FIG. 1A. As described, a camera of a computing device can be used to capture an image of an item. In this example, the item is a bottle. An application executing on the computing device or at least in communication with the computing device can analyze the image data to attempt to recognize the item to retrieve information associated with the item. In some situations; however, the item may not be recognized. In such a situation, the user can be presented an interactive interface, or game, that can be used to entertain the user as well as provide a means to determine annotation information that can be used to determine a visual similarity between items, determine recommended content, improve image processing algorithms, etc. An example game is a "dots game."

In this example, the image data 310 is segmented into a plurality of image regions, segments, or patches. Segmenting the image data can include analyzing the image data 310 to extract a plurality of regions, e.g., a region of pixels, from the image data, from which one or more colors in the image can be identified. As shown in block 310, image data 310 is segmented into a plurality of regions, each region including a portion of image data 310. The plurality of regions can be analyzed to determine a descriptor (e.g., a visual feature descriptor such as a color descriptor) for each region, where the descriptor describes the colors in a respective region. In various embodiments, a descriptor can also describe visual features based on patterns, texture, and other visual arrangements represented in the image data.

Similarity service 202 is operable to use the descriptors determined from image data 310 to determine a set of patches associated with colors that are visually similar to colors that are described by the descriptors. For example, a descriptor for a particular image region can be compared against a set of patches stored in catalog data store 214. As described, one or more patches stored in catalog data store 214 can be associated with product of an electronic catalog of products provided by a service provider, such as one that provides an electronic marketplace. Upon comparison, respective visual similarity scores can be determined. A patch stored in catalog data store 214 that is associated a visual similarity score that satisfies a selection criterion can be included in an interactive interface. This can include patches associated with a highest similarity score, patches associated with a similarity score that satisfies a threshold value, or patches that satisfy some other criterion. Comparing can include, for example, comparing RGB (e.g., a RGB color space) values of an image region against RGB value associated with a patch. In another approach, comparing can include, for example, using a distance measurement, e.g., dot product, to generate a visual similarity score. Block 312 includes a portion of the patches that satisfy the selection criterion. These patches can be included in an interface of a game or other such interactive interface such as interactive interface 314. In this example, interactive interface 314 includes a plurality of graphical elements, e.g., dots, arranged in a particular manner. As part of the rules of the game, a user is provided a task or goal to identify dots that are the same color.

Figure 4:
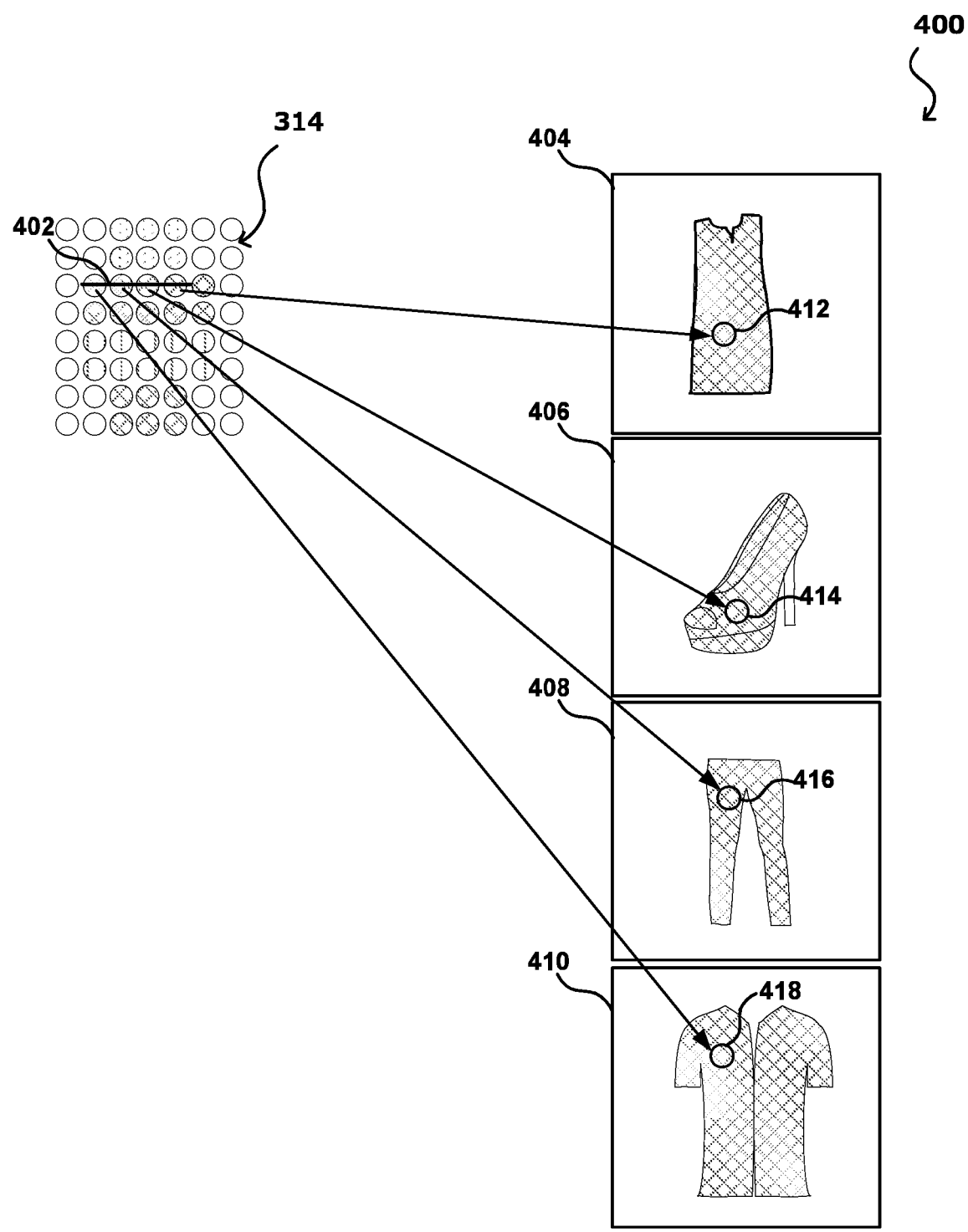
FIG. 4 illustrates a user interacting with an interactive interface in accordance with various embodiments.

Example 400 of FIG. 4 illustrates a user playing the dots game. As shown, the user has selected adjacent dots 402 of the same color, where the selection can generate annotation information that can be utilized to determine recommended products, such as products of a same and/or complementary color. For example, as described, a dot can be associated with a patch of a product. In this example, the selected dots correspond to patches obtained from dress 404, shoe 406, pants 408, and shirt 410. The color annotation information indicates that these products or at least the patches of these products (patches 412, 414, 416, 418) are the same color to an acceptable deviation. The annotation information can be obtained from a plurality of users via a plurality of different computing devices. The annotation information can be processed and utilized in various applications. This can include, for example, performing various statistical processes on the annotation information. The processed annotation information can be used to associate products, such as clothing that may be worn together, items that may be arranged together as part of a display, or other such relations that may not otherwise be discernible from descriptive information available in an electronic catalog. For example, in the situation where a user is viewing a red dress, shoes that complement the dress can be displayed with the dress.

Figure 5:
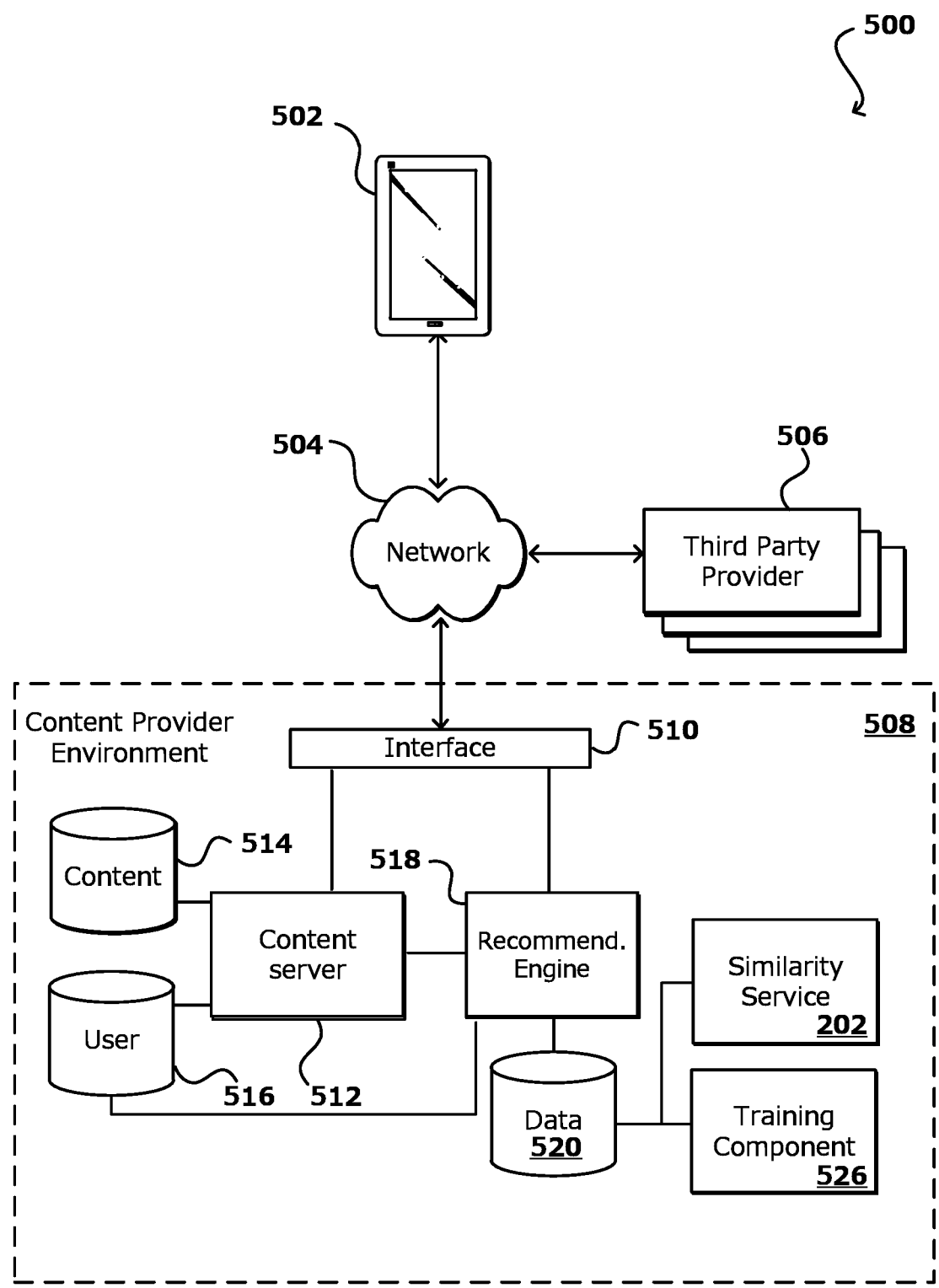
FIG. 5 illustrates an example of an environment for implementing aspects in accordance with various embodiments.

FIG. 5 illustrates an example environment 500 in which various embodiments can be implemented. In this environment, annotation information can be determined and utilized as a ground truth to train various image processing algorithms as well as be used by a recommendation engine to recommend items that may be able to be associated in some way, such as clothing that may be worn together, items that may be arranged together as part of a display, etc.

As an initial process, a convolutional neural network (CNN) can be trained using images of apparel items that include metadata that includes, for example, labeled color data corresponding to color(s) of the apparel item, a description of the apparel item, a title of the apparel item, a category of the apparel, etc. It should be noted that training a CNN may involve significant use of computation resources and time, such that this may correspond to a preparatory step to servicing search requests and/or performed relatively infrequently with respect to search request servicing and/or according to a schedule.

An example process for training a CNN for generating descriptors that can be utilized to describe visual features of an image begins with building a set of training images. In accordance with various embodiments, each image in the set of training images can be associated with a color label describing a color of an item of interest represented in the image and/or color labels that describe the color of patches of the item of interest. According to various embodiments, training images and respective training color labels can be located in a data store 520 that includes images of a number of different items of interest. A training component 526 can utilize a training data set (i.e., the images and associated color labels) to train a CNN. In accordance with various embodiments, a CNN can be used to determine color represented in an image patch. As further described, CNNs include several learning layers in their architecture. An image from the training data set is analyzed using the CNN to extract a feature vector from the network before the classification layer. The feature vector can describe the color of image data represented in an image patch. This process can be implemented for each of the images in the data set, and the resulting color feature vectors, descriptors, or other information describing the color of image data for an image and/or image patch can be stored in, for example, data store 520.

In accordance with various embodiments, when a visual search query is received, for example, the image data included in the visual search query can be segmented using an image segmentation component of similarity service 202 into a plurality of image regions, segments, or patches. Each image segment can be analyzed to determine, for example, a descriptor that describes one or more colors of a respective image region. As described, the trained CNN can be utilized to analyze the image patches. A matching module of similarity service can compare a descriptor for a particular image region against a stored set of descriptors or other information. Upon comparison, respective visual similarity scores can be determined. The similarity scores measure a similarity between a color in an image region and a color in a color sample. In this example, a patch associated a score that satisfies a selection criterion can be included in an interactive interface that includes colors that are visually similar to colors in the image. Thus, in this example, the interface includes one or more colors that are visually similar to the colors in the image. The interface can be provided to a computing device for display.

The interface can display a particular arrangement of graphical elements corresponding to the patches. That is, each graphical element is associated with one of the patches, and thus, may display a color of its associated patch. The graphical elements can be arranged, for example, in a rectangle arrangement, a square arrangement, or other such arrangement. Once the interactive interface is displayed, a user can be provided a task or goal, such as to select adjacent graphical elements that are the same color. It should be noted that various other task or goals known in the art may be implanted in accordance with various embodiments described herein. Accordingly, a user operating the computing device can select adjacent graphical elements of the same color, where selecting adjacent graphical elements of the same color can generate color annotation information that can be utilized to determine products of a same and/or complementary color and/or stored in data store 520. For example, as described, a graphical element is associated with a patch, and thus, is associated with color information for an area of a product, such as a dress. An adjacent graphical element can be associated with a different area of the product, an area of some other product (e.g., a different dress or a shirt), etc. It should be noted that the product category is not limited to dresses, but can be any product category such as apparel categories, footwear categories, accessory categories etc. The annotation information indicates that these products or at least the areas of these products are the same color. Accordingly, annotation information determined from a plurality of users can be used to associate products, such as clothing that may be worn together, items that may be arranged together as part of a display, or other such relations. Thus, a person desiring to purchase a particular outfit might wear other goods that are determined to match the particular outfit, such as an accessory in a complimentary color. As such, in response to a query or other search and/or browsing approach for an item, the color annotation information can be used to recommend items that match or otherwise compliment the item.

For example, in a post processing aspect of the environment, a user is able to use a client device 502 to submit a request for content, such as a webpage or page of an electronic book, across at least one network 504. Although a portable computing device (e.g., an electronic book reader, smart phone, or tablet computer) is shown as the client device, it should be understood that any electronic device capable of receiving, determining, and/or processing input can be used in accordance with various embodiments discussed herein, where the devices can include, for example, desktop computers, notebook computers, personal data assistants, video gaming consoles, television set top boxes, wearable computers (i.e., smart watches and glasses) and portable media players, among others.

The at least one network 504 can include any appropriate network, such as may include the Internet, an Intranet, a local area network (LAN), a cellular network, a Wi-Fi network, and the like. The request can be sent to an appropriate content provider environment 508, which can provide one or more services, systems, or applications for processing such requests. The content provider can be any source of digital or electronic content, as may include a website provider, an online retailer, a video or audio content distributor, an e-book publisher, and the like.

In this example, the request is received to a network interface layer 510 of the content provider environment 508. The network interface layer can include any appropriate components known or used to receive requests from across a network, such as may include one or more application programming interfaces (APIs) or other such interfaces for receiving such requests. The network interface layer 510 might be owned and operated by the provider, or leveraged by the provider as part of a shared resource or "cloud" offering. The network interface layer can receive and analyze the request from the client device 502, and cause at least a portion of the information in the request to be directed to an appropriate system or service, such as a content server 512 (e.g., a Web server or application server), among other such options. In the case of webpages, for example, at least one server 512 might be used to generate code and send content for rendering the requested Web page. In cases where processing is to be performed, such as to generate search results, perform an operation on a user input, verify information for the request, etc., information might also be directed to at least other server for processing. The servers or other components of the environment might access one or more data stores, such as a user data store 516 that contains information about the various users, and one or more content repositories 514 storing content able to be served to those users.

As mentioned, in at least some embodiments the content to be provided can include data 520 for one or more recommendations, advertisements, or other such elements that are selected based on information for the user associated with the request, for example by providing information to a recommendation engine 518 or other such component or service, for analyzing the provided information and attempting to generate recommendations or other elements as discussed herein. In some embodiments, this can utilize content generated within the content provider environment 508 or received from one or more third party providers 506, among other such options. For example, in the situation where the user is viewing a product associated with color annotation information, the color annotation information can be provided to the recommendation engine 518 to associate products, such as clothing that may be worn together, items that may be arranged together as part of a display, or other such relations that may not otherwise be discernible from descriptive information available in an electronic catalog of products. For example, a person desiring to purchase a particular outfit might wear other goods that are determined to match the particular outfit, such as an accessory in a complimentary color. As such, in response to a query or other search and/or browsing approach for an item of interest, the color annotation information for the current item of interest being viewed can be used to recommend items that match or otherwise compliment the item of interest.

Figure 6:
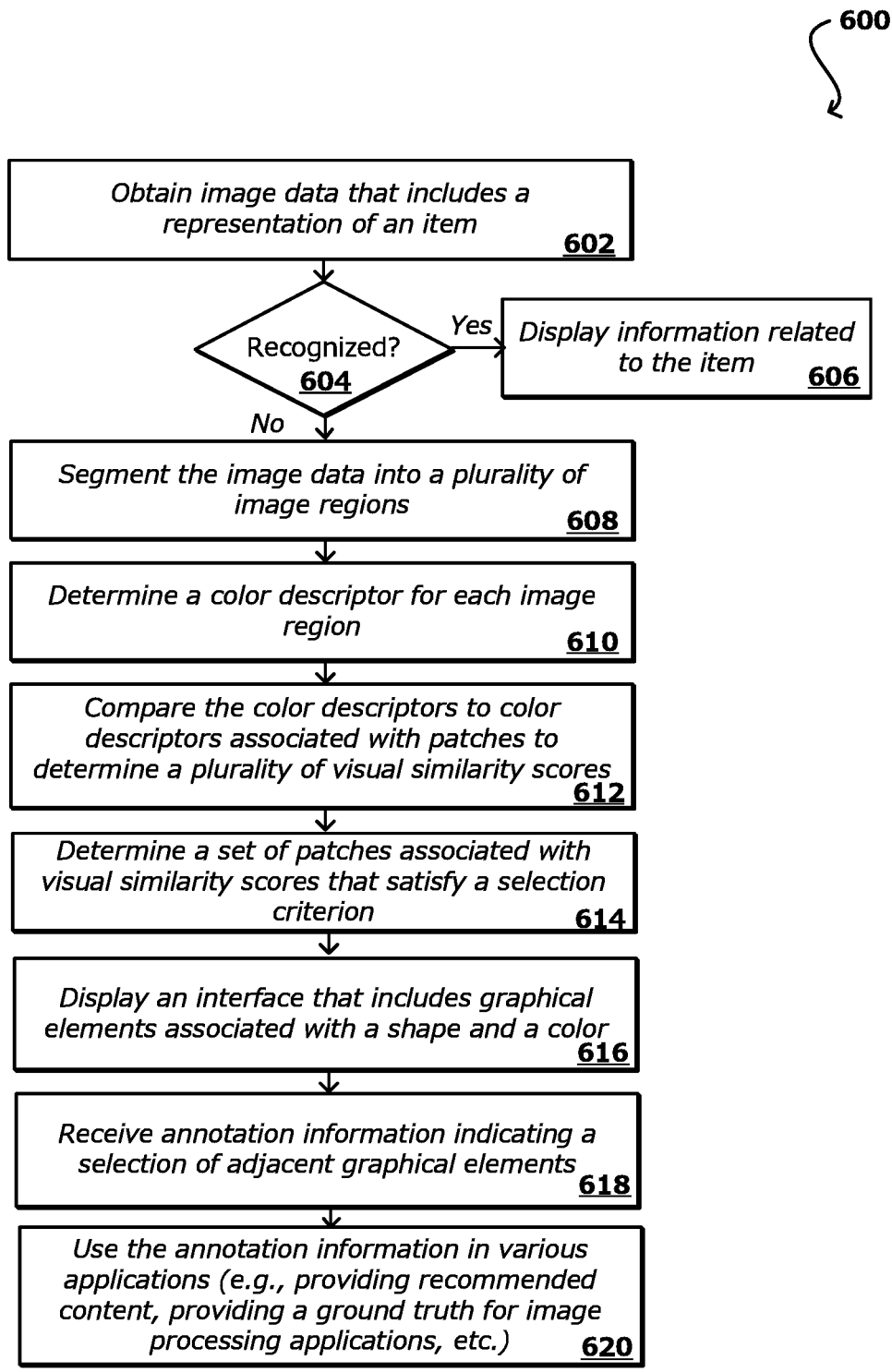
FIG. 6 illustrates an example process for generating annotation information that can be utilized in accordance with various embodiments.

FIG. 6 illustrates an example process 600 for determining a representative region in accordance with various embodiments. It should be understood that there can be additional, fewer, or alternative steps performed in similar or alternative orders, or in parallel, within the scope of the various embodiments unless otherwise stated. In this example, image data that includes a representation of an item is obtained 602. The image data is analyzed and a determination 604 is made whether the item represented in the image data can be recognized. In the situation where the item is recognized, information related to the item can be displayed 606, for example, on a display screen of a computing device. The information can include product information associated with the recognized item, which can enable the user to learn more about and/or purchase the item from an electronic marketplace. In some situations; however, the item may not be recognized. In such a situation, the user can be presented an interactive interface, e.g., a game, which can be used to entertain the user as well as provide a means to determine annotation information that can be used to determine a visual similarity between items. An example game is a "dots game."

In this situation, the image data can be segmented 608 into a plurality of image regions, segments, or patches. Segmenting the image data can include analyzing the image data to determine a plurality of regions, e.g., a region of pixels, from the image data, from which one or more colors in the image can be identified. The image region can be a fixed width and a fixed height or a variable width and variable height depending on the application, image resolution, display screen resolution, among other such factors. Each image segment can be analyzed to determine 610, for example, a color descriptor that describes a one or more colors of a respective region. In various embodiments, a color descriptor can also describe visual features based on patterns, texture, and other visual arrangements represented in the image data. The color descriptor for each of the regions can be compared 612 against a set of stored color descriptors associated with patches to determine a plurality of visual similarity scores. As described, each patch (i.e., patch of color) is associated with an area of a product. For example, a patch can be a swath, e.g., a region of a product such as an area of a dress or other article of clothing. A size of a patch is such that it ideally encloses one color represented in the image data. The similarity scores measure a similarity between a color in an image region and a color in a patch. A patch associated with a score that satisfies a selection criterion can be included in an interactive interface. This can include patches associated with a highest similarity score or patches associated with a similarity score that satisfies a threshold value, for example. Accordingly, a set of patches that satisfy the selection criterion is determined 614.

Once the set of patches are determined, an interface that includes graphical elements associated with at least a shape (e.g., a circle, a square, a triangle, etc.) and a color are displayed 616. The interface can include colored graphical elements that are visually similar to the colors and location of colors in the image data. The interface can be an interface of a game, for example, and the game displayed can be based on user profile information, user purchase information, user interaction information, etc. In this example, the interface can display a particular arrangement of graphical elements, where each graphical element can be associated with one of the patches in the set of patches and can be the color of its associated patch. This can include, for example, arranging a plurality of graphical elements, e.g., dots, in a rectangle arrangement, a square arrangement, or other such arrangement, where the position of each of the graphical elements substantially matches a position of its respective region in the image data. For example, the color of a graphical element for a given position in the interface likely matches a color represented in image data in the query image for a substantially similarly position. Thus, while the query image represents an item for which the user is searching, the interface is a set of colored graphical elements that substantially match the color of pixels represented in the image data and positioned at a similar position with respect to one another.

The interface can provide the user a task or goal, such as to select adjacent graphical elements of the same color. In response to receiving a selection of adjacent graphical elements, annotation information indicating a selection of the adjacent graphical elements can be received 618. The annotation information can be stored and/or used 620 in various applications, as may include determining recommend content, providing a ground truth in various image processing algorithms, etc. In an example of providing recommended content, in response to a search, user selection of product, viewing of a product page, purchase of a product, or other such action, the annotation information can be used to recommend complementary products. For example, as described, a graphical element is associated with a patch of a product, such as a dress. An adjacent graphical element may be associated with a patch of a different product, such as a different dress or a shirt, for example. The annotation information indicates that these products or at least the patches of these products are the same. As such, the annotation information can be used to associate products, such as clothing that may be worn together, items that may be arranged together as part of a display, or other such relations that may not otherwise be discernible from descriptive information available in an electronic catalog of products.

In various embodiments, the interactive interfaces may be displayed at any one of a number of possible times. This can include, for example, displaying the interactive interfaces in response to a failed visual search, at a predetermined interval of time, in response to particular triggers, upon completion of an electronic checkout process of an electronic marketplace, in response to adding a product to a wish list or virtual shopping cart of an electronic marketplace, in response to purchasing a product, upon determining a user has accessed an application a predetermined number of times, or any time that would be reasonable as determined by one skilled in the art. In various embodiments, a user may interact with a community of users. For example, users within the community may share results of games, submit questions related to games, etc. In certain embodiments, users may obtain points or other monetary as well as nonmonetary value for participating in the games.

Figure 7:
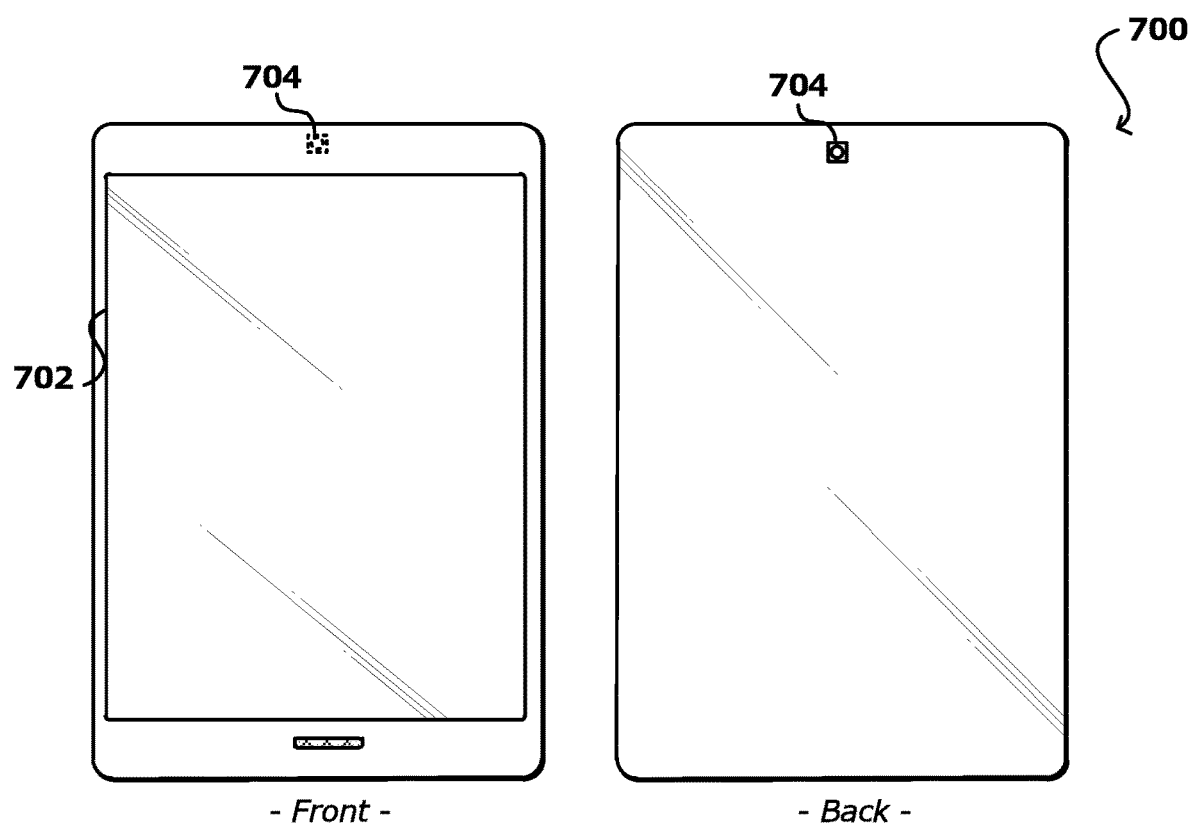
FIG. 7 illustrates an example device that can be used to implement aspects of the various embodiments.

FIG. 7 illustrates an example of a computing device 700 that can be used in accordance with various embodiments. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 700 has a display screen 702, which under normal operation will display information to a user facing the display screen (e.g., on the same side of the computing device as the display screen). The computing device in this example can include one or more image capture elements, in this example including one image capture element 704 on the back side of the device, although it should be understood that image capture elements could also, or alternatively, be placed on the sides or corners of the device, and that there can be any appropriate number of capture elements of similar or different types. Each image capture element 704 may be, for example, a camera, a charge-coupled device (CCD), a motion detection sensor, or an infrared sensor, or can utilize any other appropriate image capturing technology. The computing device can also include at least one microphone or other audio capture element(s) capable of capturing other types of input data, as known in the art, and can include at least one orientation-determining element that can be used to detect changes in position and/or orientation of the device. Various other types of input can be utilized as well as known in the art for use with such devices.

Figure 8:
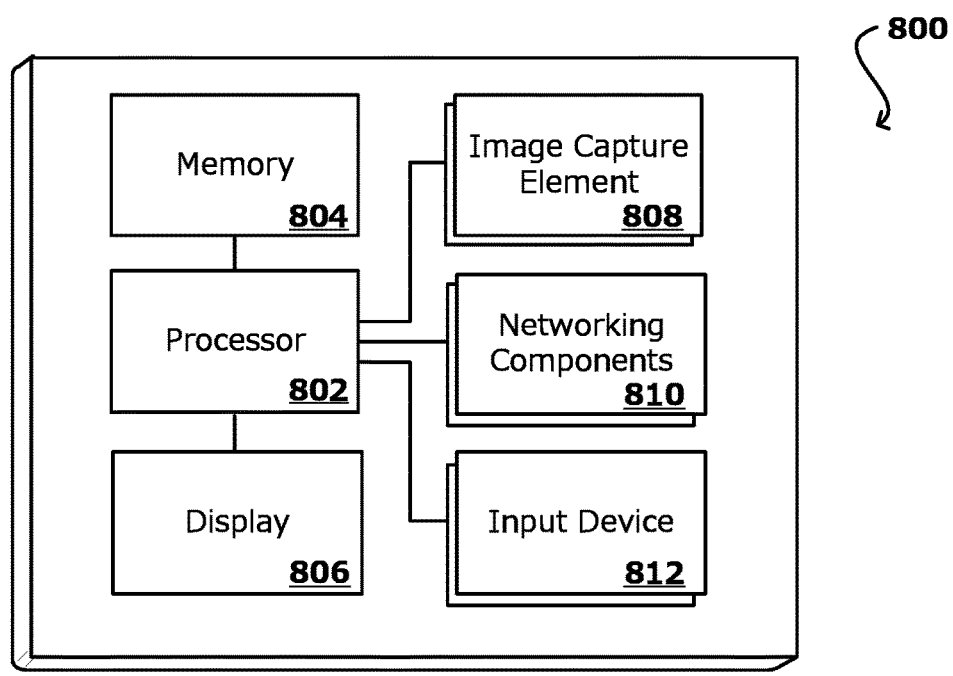
FIG. 8 illustrates example components of a client device such as that illustrated in FIG. 7.

FIG. 8 illustrates a set of basic components of a computing device 800 such as the device 700 described with respect to FIG. 7. In this example, the device includes at least one processor 802 for executing instructions that can be stored in a memory device or element 804. As would be apparent to one of ordinary skill in the art, the device can include many types of memory, data storage or computer-readable media, such as a first data storage for program instructions for execution by the processor 802, the same or separate storage can be used for images or data, a removable memory can be available for sharing information with other devices, and any number of communication approaches can be available for sharing with other devices. The device typically will include some type of display element 806, such as a touch screen, electronic ink (e-ink), organic light emitting diode (OLED) or liquid crystal display (LCD), although devices such as portable media players might convey information via other means, such as through audio speakers. As discussed, the device in many embodiments will include at least one image capture element 808, such as at least one ambient light camera that is able to image a user, people, or objects in the vicinity of the device. An image capture element can include any appropriate technology, such as a CCD image capture element having a sufficient resolution, focal range and viewable area, to capture an image of the user when the user is operating the device. Methods for capturing images or video using an image capture element with a computing device are well known in the art and will not be discussed herein in detail. It should be understood that image capture can be performed using a single image, multiple images, periodic imaging, continuous image capturing, image streaming, etc.

Figure 9:
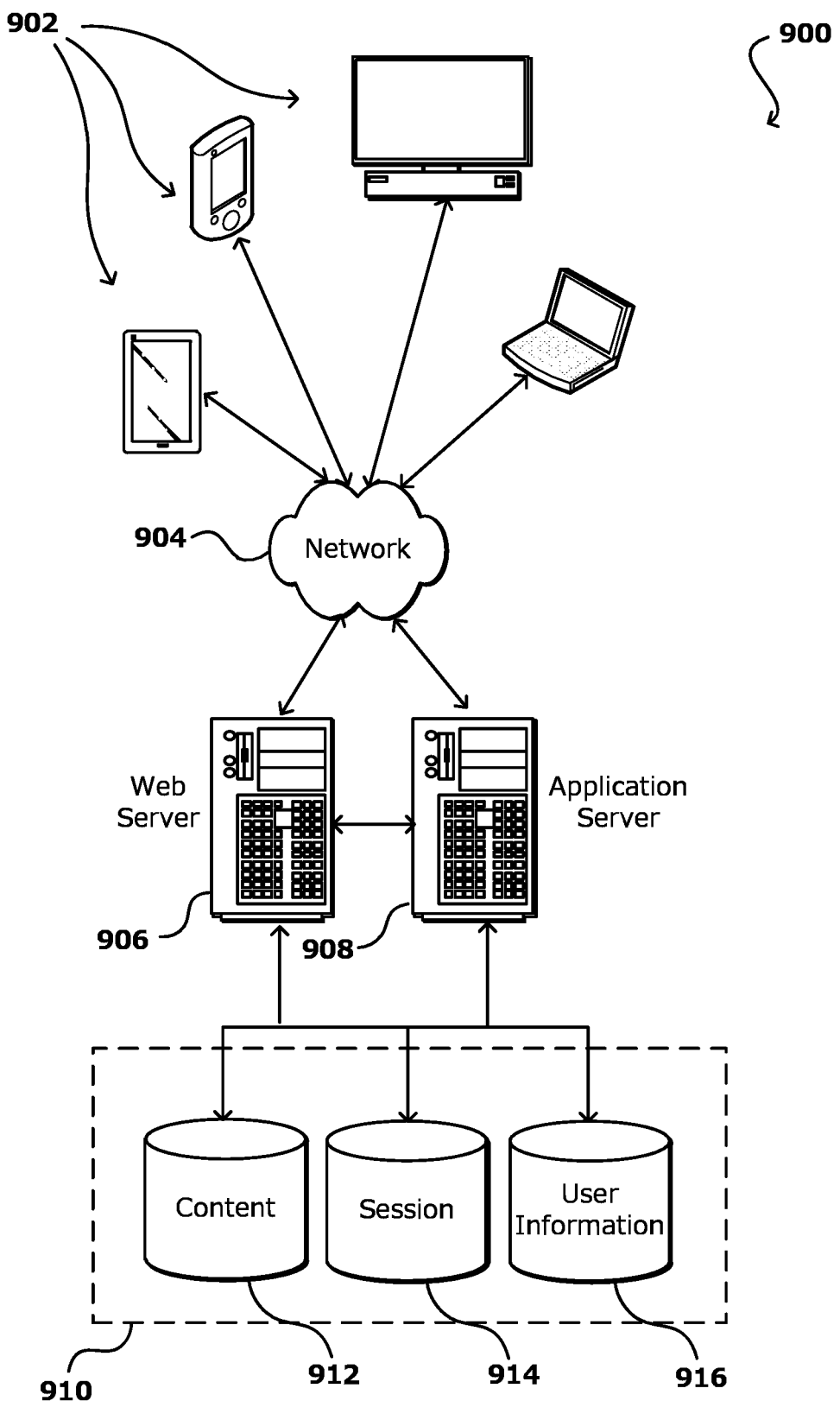
FIG. 9 illustrates an example of an environment for implementing aspects in accordance with various embodiments.

The device can include one or more networking components 810 enabling the device to communicate with remote systems or services such as content providers and rights determining systems. These components can include, for example, wired or wireless communication components operable to communicate over a network such as a cellular network, local area network, or the Internet. The device can also include at least one additional input device 812 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device. As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving image data that includes a representation of an object;
   dividing at least a portion of the image data into a plurality of regions;
   determining at least one descriptor for each of the plurality of regions;
   comparing the at least one descriptor for each of the plurality of regions with at least one stored descriptor of a set of stored descriptors, the at least one stored descriptor associated with a color or a texture;
   generating an interface that includes a plurality of graphical elements, each graphical element of the plurality of graphical elements comprising at least one of a respective color or texture associated with at least one stored descriptor of the set of stored descriptors, each graphical element of the plurality of graphical elements presented separate from the image data, wherein at least a subset of the set of stored descriptors is associated with a respective product in an electronic catalog of products; and
   in response to receiving a user interaction of at least one graphical element of the graphical elements, generating annotation information for a product associated with the at least one graphical element.

2. The computer-implemented method of claim 1, further comprising:
   generating the interface that includes the plurality of graphical elements in response to receiving the image data.

3. The computer-implemented method of claim 2, further comprising:
   analyzing the image data to determine the at least one descriptor for each of the plurality of regions, the at least one descriptor for each of the plurality of regions associated with a color, a pattern, or a texture of at least part of the image data.

4. The computer-implemented method of claim 3, further comprising:
   generating a comparison score based on comparing the at least one descriptor for each of the plurality of regions with the at least one stored descriptor.

5. The computer-implemented method of claim 1, further comprising:
   generating a comparison score associated with a comparison between a descriptor for the at least one graphical element and a stored descriptor, and
   generating annotation information when the comparison score satisfies a threshold.

6. The computer-implemented method of claim 1, wherein the user interaction comprises a user selection of a graphical element having a color, a texture, or a pattern that is associated with a corresponding color, texture, or pattern of a product.

7. The computer-implemented method of claim 1, wherein generating the interface occurs following at least one of:
an execution of an image recognition algorithm,
a predetermined time interval,
completion of an electronic purchase transaction, or
a user's placement of a product in a virtual shopping cart in an electronic marketplace.

8. The computer-implemented method of claim 1, wherein the user interaction of at least one graphical element comprises selecting the at least one graphical element or moving the at least one graphical element.

9. A system, comprising:
at least one processor; and
memory including instructions that, when executed by the at least one processor, cause the system to:
receive image data that includes a representation of an object;
divide at least a portion of the image data into a plurality of regions;
determine at least one descriptor for each of the plurality of regions;
compare the at least one descriptor for each of the plurality of regions with at least one stored descriptor of a set of stored descriptors, the at least one stored descriptor associated with a color or a texture;
generate an interface that includes a plurality of graphical elements, each graphical element of the plurality of graphical elements comprising at least one of a respective color or texture associated with at least one stored descriptor of the set of stored descriptors, wherein at least a subset of the set of stored descriptors is associated with a respective product in an electronic catalog of products;
receive a user interaction of at least one graphical element of the graphical elements; and
generate annotation information for a product associated with the at least one graphical element, based at least in part on the user interaction.

10. The system of claim 9, wherein the user interaction of at least one graphical element of the graphical elements comprises at least one of:
selecting the at least one graphical element,
selecting adjacent graphical elements, or
moving a graphical element.

11. The system of claim 9, wherein the instructions when executed cause the system to generate an interface in response to:
a completed execution of an image recognition algorithm;
a user's reservation of an item for purchase in a virtual shopping cart;
arrival at a predetermined time interval; or
a user's completion of an electronic purchase.

12. The system of claim 11, wherein the instructions when executed further cause the system to:
analyze an image following the completed execution of an image recognition algorithm; and
determine at least one visual descriptor for at least one portion of the image, the at least one visual descriptor associated with a color, texture, or pattern of the at least one portion of the image.

13. The system of claim 12, wherein the instructions when executed further cause the system to:
compare the at least one visual descriptor for the at least one portion of the image with at least one stored visual descriptor;
determine a similarity score based on the step of comparing the at least one visual descriptor with the at least one stored visual descriptor;
determine whether the similarity score meets a predetermined selection criterion; and
generate the interface that includes the plurality of graphical elements using the at least one stored visual descriptor when the similarity score meets the predetermined selection criterion.

14. The system of claim 12, wherein the at least one visual descriptor for the at least one portion of the image is determined using a trained classifier.

15. The system of claim 9, wherein the instructions when executed further cause the system to:
evaluate the annotation information for the product associated with the at least one graphical element; and
identify other products that are associated with the annotation information for the product associated with the at least one graphical element.

16. A non-transitory computer-readable storage medium including instructions that, when executed by at least one processor of a computing system, cause the computing system to:
receive image data that includes a representation of an object;
divide at least a portion of the image data into a plurality of regions;
determine at least one descriptor for each of the plurality of regions;
compare the at least one descriptor for each of the plurality of regions with at least one stored descriptor of a set of stored descriptors, the at least one stored descriptor associated with a color or a texture;
generate a plurality of graphical elements, each graphical element of the plurality of graphical elements including at least one of a color, a pattern, or a texture associated with at least one stored descriptor of the set of stored descriptors, each graphical element of the plurality of graphical elements presented separate from the image data;
receive a user interaction of at least one graphical element of the plurality of graphical elements; and
generate annotation information for a product associated with the at least one graphical element, based at least in part on the user interaction.

17. The non-transitory computer-readable storage medium of claim 16, wherein the user interaction of at least one graphical element of the plurality of graphical elements comprises at least one of:
selecting the at least one graphical element,
selecting adjacent graphical elements,
selecting graphical elements having the same color and/or complementary colors, or
moving a graphical element.

18. The non-transitory computer-readable storage medium of claim 16, wherein the instructions when executed cause the computing system to generate a plurality of graphical elements in response to at least one of:
an unsuccessful execution of an image recognition algorithm;
an addition of a product to a virtual shopping cart in an electronic marketplace;
a predetermined time interval;
a completion of a product purchase in an electronic marketplace.

19. The non-transitory computer-readable storage medium of claim 16, wherein the instructions when executed further cause the computing system to:
- generate a descriptor associated with at least one of a color, a pattern, or a texture; and
- generate a comparison scored based on a comparison between the descriptor associated with the color, the pattern, or the texture and a stored descriptor associated with a stored color, a stored pattern, or a stored texture.

20. The non-transitory computer-readable storage medium of claim 19, wherein the instructions when executed further cause the computing system to generate a graphical element when the comparison score meets a predetermined selection criterion.

* * * * *